United States Patent [19]

Burry

[11] 4,073,854
[45] Feb. 14, 1978

[54] METHOD OF MULTI-MATERIAL INJECTION MOULDING

[76] Inventor: Arthur Burry, 290 Adelaide Street West, Toronto, Ontario, Canada

[21] Appl. No.: 650,373

[22] Filed: Jan. 19, 1976

Related U.S. Application Data

[63] Continuation-in-part of Ser. No. 456,752, April 1, 1974, abandoned.

[30] Foreign Application Priority Data

Mar. 12, 1974 Canada ................................. 194754

[51] Int. Cl.² .............................................. B29F 1/12
[52] U.S. Cl. ................................... 264/161; 264/245; 264/246; 264/247
[58] Field of Search ............... 264/161, 245, 246, 247; 425/130, 134

[56] References Cited

U.S. PATENT DOCUMENTS

| | | | |
|---|---|---|---|
| 2,279,208 | 4/1942 | Shaw | 425/130 X |
| 2,492,973 | 1/1950 | Dofsen | 264/161 X |
| 2,671,933 | 3/1954 | Nye | 264/161 |
| 2,766,482 | 10/1956 | Heibel | 425/245 |
| 3,031,722 | 5/1962 | Gits | 264/161 X |
| 3,702,750 | 11/1972 | Veneria | 425/130 |
| 3,776,998 | 12/1973 | Church | 264/328 X |
| 3,822,107 | 7/1974 | Wogerer | 264/245 X |

Primary Examiner—Richard R. Kucia
Attorney, Agent, or Firm—Finnegan, Henderson, Farabow & Garrett

[57] ABSTRACT

The invention discloses a process of multi-material moulding using a novel material guidance device or transfer plate which also acts as a transport mechanism to guide, from one moulding station, a partially moulded component or article, along a controlled flow path, to another station and to register the said article into the requisite second cavity thereat for subsequent moulding of another mould material. The transport mechanism, on arrival at the second station, may, but need not, be stripped away from the partially moulded component contained thereon, but only after the article is disposed into the registration within a subsequent or second cavity located at the second mould station. Under the preferred embodiment, the transfer plate acts as a core member to the mould of the cavity during at least one moulding step; in its simplest form the transfer plate is flat.

7 Claims, 29 Drawing Figures

METHOD OF MULTI-MATERIAL INJECTION MOULDING

This application is a continuation-in-part-application to application Ser. No. 456,752 filed Apr. 1, 1974, now abandoned.

This invention relates to a method of manufacturing articles and particularly multi-material articles and to a mould therefore. The invention also relates to multi-color moulding of a single article.

Injection or transfer moulding or die casting processes are commonly employed for the manufacture of articles comprising one material or color. Not so common are multicolored or multi-material moulding processes for the manufacture of an article incorporating more than one material or material color.

Heretofore, the manufacture of such multi-material articles has been limited by the economics of known processes and the prior art and economics to the production of articles comprising generally only two separate colors or materials with further specific design limitations imposed by the presently known and practiced art and technologies.

For instance, one of the two major processes involves the use of moulds which have moveable sections incorporated into the cavity (core valves). The first color or material is moulded in a primary portion of the mould and remains therein; then the next material requiring injection therein is inserted after an appropriate section of the mould core or cavity has been either withdrawn or superimposed to provide the necessary vacancy for intrusion of the second mould material. Such a method is disclosed by Wogerer in U.S. Pat. No. 3,822,107 issued July 2, 1974 for "Improvements in or relating to an Injection Mold."

Yet another method is to initially injection mould the first material (or primary color) producing an incomplete article, then to remove it from said mould and its transfer as an individual item to yet another mould cavity (with core set) for the injection therein of the next mould material as for example a second color.

A variation of this technique is that disclosed by Gits in U.S. Pat. No. 3,031,722 issued May 1, 1962 for "Methods of making molded articles." That technique requires a transfer plate to convey a partially moulded article between a first (completed) and a second (to be completed) moulding station. The transfer plate is formed however with recesses on grooves (hence are mandatory appendages) into which the first mould material collects so as to hold the partially moulded article during interstation transport. These mandatory appendages limit substantially the type (shape) of moulding which may be done and amount for practical purposes to two different materials.

(In the balance of this disclosure a material shall include a composition of designatable properties or characteristics; two materials shall be different if the constituant components of the composition are different. Hence when the composition of two materials are identical save as to color they shall be deemed to be two different materials, even though the physical properties or characteristic, other than color, are the same.)

I have found that such limitations as are presently imposed on the manufacture of articles comprising more than one material can be eliminated by a process and system now made possible by a simple and novel tool system and product manufacturing sequence.

The present invention achieves a process of moulding an article from the plurality of materials. The materials preferably as selected from within the family of thermosetting plastic and thermoplastic materials although any composition of organic or inorganic material which may be liquified and subsequently solidified into a desired shape may be used.

One of the significant aspects of my invention, besides providing the simple means of multi-material moulding and providing accurate registration of a partially moulded article from one cavity to another, is that the guide plate inhibits shrinkage of the runner and hence alteration of the relevant position of a moulded or partially moulded article simply by virtue of the fixed position of a sprue to the guide plate. This is ideally achieved by making the guide plate also serve as the core of the mould, and designing the sprue channel and gate so as to be defined by the guide plate and to communicate with the resultant cavity.

The invention contemplates a method of moulding an article in a plurality of stages which comprises:

a. at a first moulding station assembly a mould including a transfer plate and a mould cavity;

b. said transfer plate having a surface defining part of said mould surface and having at least one channel spaced from said mould defining surface and communicable therethrough with said mould cavity whereby a first moulded stage is held in a fixed oriented relationship through said transfer plate;

c. transferring said transfer plate and said moulded stage to a second moulding station and into registration with a second mould cavity having a different configuration to mould a second stage;

d. injecting further mouldable material through a further channel of said transfer plate into said second mould cavity to hold said second stage in fixed oriented relationship through said transfer plate.

The embodiments of the invention will now be described by the way of example with reference to the accompanying drawings in which.

Figure 16:
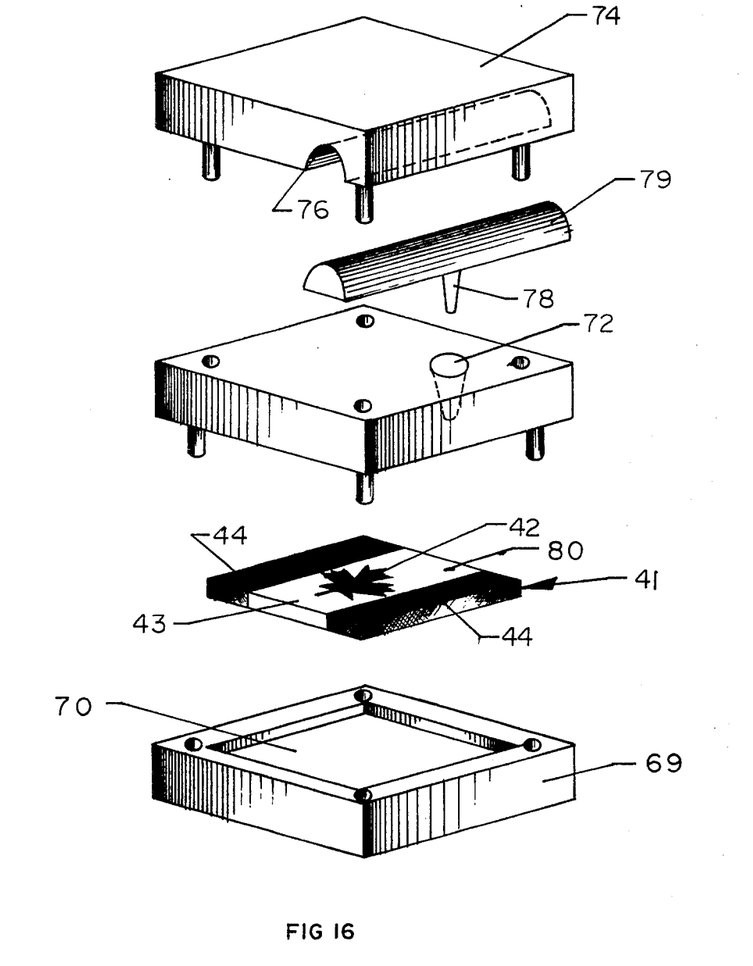
FIG. 16 is an assembly perspective of a two color moulded article being a replica of the Canadian National Flag, with the second three part mould, including runner channel and sprue chamber.

Referring to FIG. 16 a replica of the Canadian National Flag 41 may be fabricated as hereinafter set out. The Canadian National Flag is a red maple leaf 42 mounted on a white field 43 straddled by marginal red panels 44.

Figure 1:
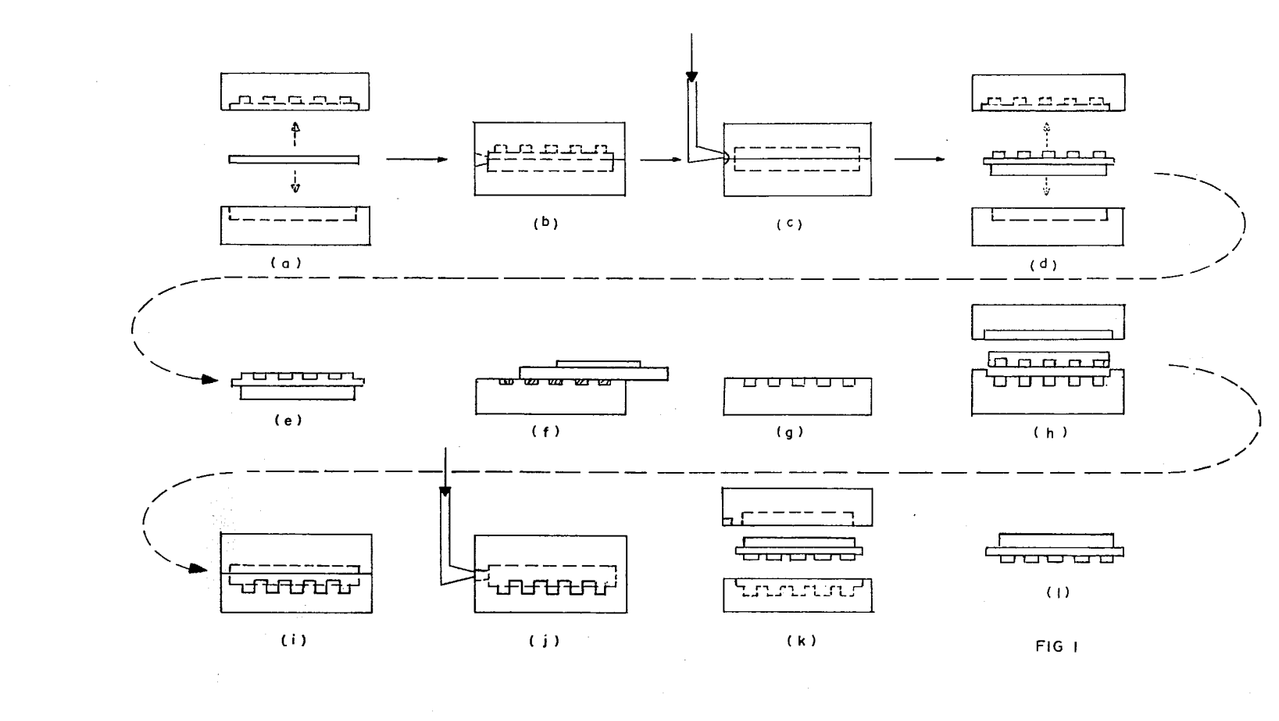
FIG. 1 schematically represents the fabrication steps (a) through (l) during a two material moulding sequence of an embodiment.
Figures 9, 10, 11, 12, 13, 14, 15:
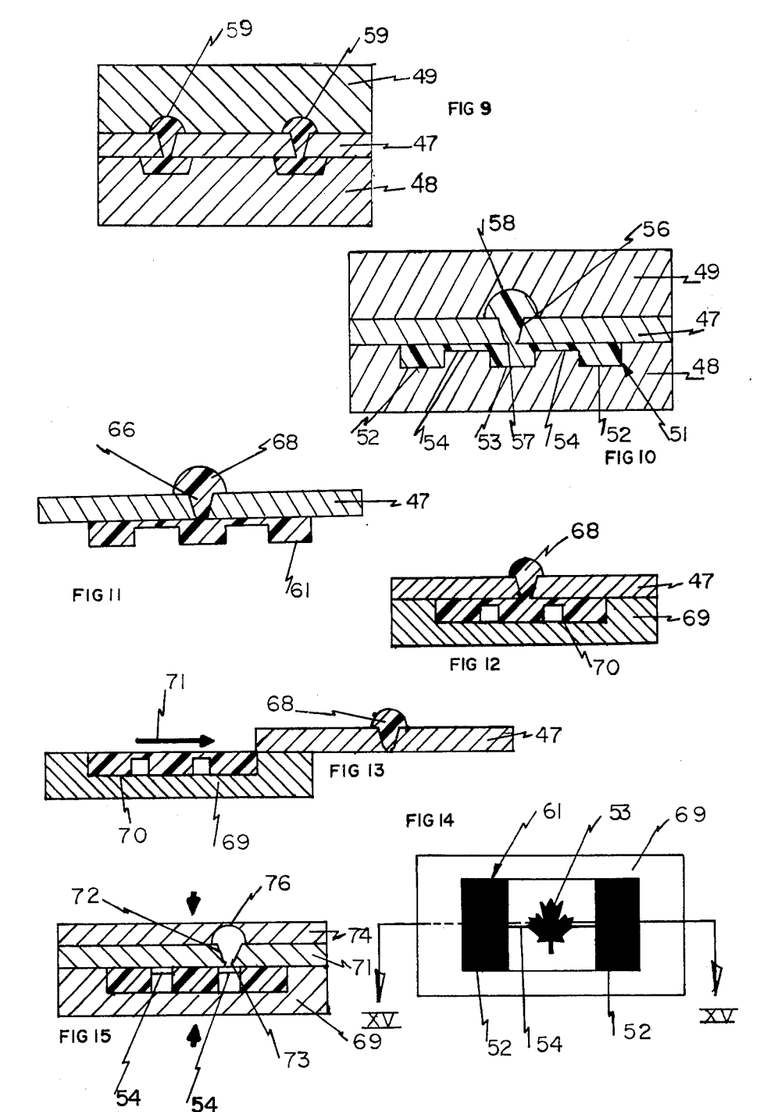
FIG. 9 is a cross section of a three part mould having two cavities, the central part thereof being the guide plate; the section is through the sprue chambers showing the cavities, sprue chamber, and runner channels in section.
FIG. 10 is a cross section of an alternative three part mould, through the sprue chamber, wherein the central part of the mould is the guide plate which acts as the core which defines with one side of a single three part cavity, and with the obverse side the runner channel.
FIG. 11 is the identical section as FIG. 10 of the guide plate, shown removed from the other parts of the mould, the moulded article shown on the underside of the guide plate connected through the sprue to the runner.
FIG. 12 is a section through a second mould cavity, with guide plate surmounting the cavity, the first moulded article occupying the second cavity region but defining therein a plenum into which a second mould material is to be injected.
FIG. 13 is the section of FIG. 12 but the guide plate partially removed as by sliding, severing the sprue from the first moulded article at the gate.
FIG. 14 is a plan view of the partially moulded article of FIG. 13, being a replica of the Canadian National Flag.
FIG. 15 is a section through a second three part mould.

Referring to FIG. 1 and step (a) and to FIG. 10, a first mould 46 used for fabrication of the replica of the Canadian National Flag 41 is composed of three components, a material guidance device or transfer plate 47, cavity member 48 mating with one side of the transfer plate 47, and a runner member 49 mating with the obverse side of the transfer plate. The cavity member 48 defines a single cavity 51 in three segments, lateral panel segments, 52 and central maple leaf image segment 53. Bridges 54 communicate the three segments together into a single cavity when the transfer plate 47 is mated with the cavity member 48, and as such acts as well as the core of the mould. The transfer plate 47, in its simplest form, is but a flat plate defining a single sprue chamber 56 and a gate 57, of restricted diameter at the interface of the sprue chamber 56 and the upper surface on face of the transfer plate. The cavity 51 communicates through the gate 57 with the sprue chamber 56 to the surmounted runner 58 defined by the runner member 49.

The three components, 47, 48 and 49 are mated close at a first moulding station, step (b) of FIG. 1. The first mould material, a red thermoplastic, is injected during step (c) of FIG. 1 into the runner 58, whence it is conveyed to the sprue chamber 56 through the gate 57 into the tri-segment cavity 51 on to setting, the mould 46 is separated at step (d) of FIG. 1 and the partially moulded article 61, step (e) is constrained on the transfer plate 47 as shown in FIG. 11. This is due to the integral moulding of the article 61, sprue 66 and runner 68; the runner 68 being obverse to the partially moulding article 61. Since most thermosetting materials shrink, in part, on cooling (unless they are mechanically constrained to contract and shrink by some structural features of the mould) the partially moulded article 61 is thereby snugly affixed or attached to the face of the transfer plate 47 without any mandatory appendages to the fired moulded article as required by other systems. The article 61, may thus be transported from one mould station to the next simply by using the transfer plate 47 as the transporting device. Thus the transport plate 47 of FIG. 11 is moved into engagement with a second cavity member 69 which defines a second cavity 70. The transfer plate 47 is "wiped-off", the second cavity member 69 by an appropriate lateral force 71; steps (f) and (g) of FIG. 1 are executed. At this time the partially moulded article 61 will be free of any appendages. It will however have run a small "scar tissue" region 68 (on gate mask) on the obverse side of the outside where the sprue 66 was joined to the article through the gate.

The plan view of the partially moulded replica 61 is that of FIG. 14.

Referring to steps (h) and (i) of FIG. 1 and to FIG. 15, a second transfer plate 71 defining sprue chamber 72 and constricting gate 73 is mated with the second cavity member 69 and a second runner member 74 in a like manner as earlier described; the second runner member 74 defining a second runner 76 which surmounts the second carrier plate 71.

Step (j) of FIG. 1 injects the white thermoplastic into the runner 76; whence white thermoplastic is injected into the second cavity 70 to form the white field for the replica.

The second mould components 69 and 71 and 74 are separated at step (k) of FIG. 1 and the completed article 41 again constrains itself snugly on the second transfer plate 71 due to the rigid connection between the article 41 and its runner 79 which is on the obverse side of the carrier plate, by the sprue 78.

Referring to the perspective assembly drawing, FIG. 16, the several components of the second mould with completed article 41 are shown, with the obverse side of the white field of the replica flag having gate mark 80. The gate marked 80, prior to severance from the sprue 78 is the connection point between the article 41, and sprue 78.

Figure 17:
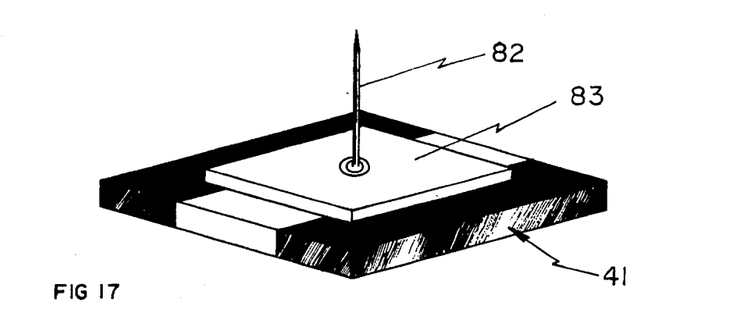
FIG. 17 is a perspective of the obverse side of the replica of the Canadian National Flag with stud pin.
Figure 18:
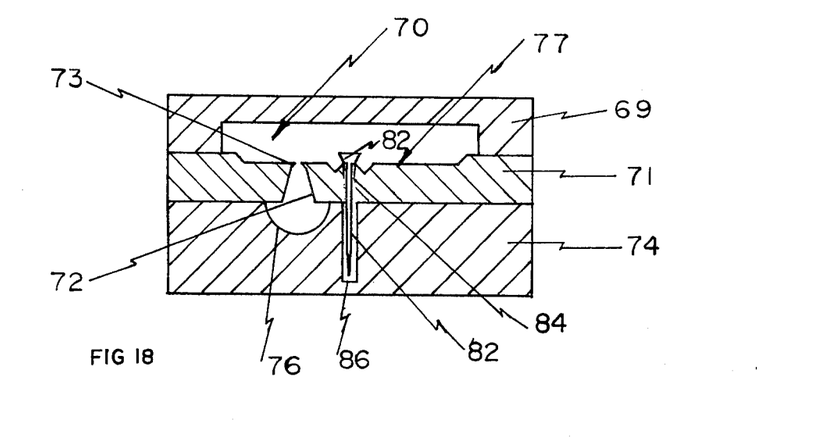
FIG. 18 is a cross section of the second mould for producing the replica of the Canadian Flag, the section being taken along the sprue chamber and pin loading platform.

Referring to FIGS. 17 and 18, when it is desired to manufacture the replica flag 41 to be used as a lapel pin, I prefer to integrally mould a pin or stud 82 to the back of the replica flag and to provide for a slightly enhanced backing of white material, as at 83, thereby slightly strengthening the back for the mounting of the pin 82. As such, the second mould components 69, 71, and 74 have the cross sections of FIG. 18. The carrier plate 71 ceases to have a flat face and is recessed at 77 to provide for the enhanced backing 83. Also, an aperture 84 is provided through the second transfer plate 71 through which the pin 82 is inserted; the runner member being provided with a well 86 which registers with the aperture 84 to accommodate the pin as shown.

Figure 2:
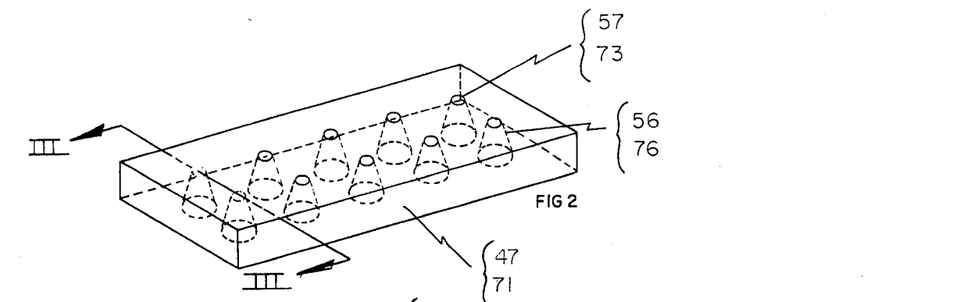
FIG. 2 is a perspective of a transfer plate in its simplest form as a flat guide plate defining sprue chambers.

Now referring to FIG. 2 the transfer plates 47 and 71 may have a plurality of sprue chambers 56, 76 and as such may be used as a guide plate defining a plurality of cavities within a cavity member. The number of cavities selected, and hence sprue chambers required (at least on sprue chamber per cavity) will depend on the design criteria, the article to be moulded, the mould material, and other factors which will now be apparent to those skilled in the art and which will in part be further elaborated hereafter.

Figure 3:
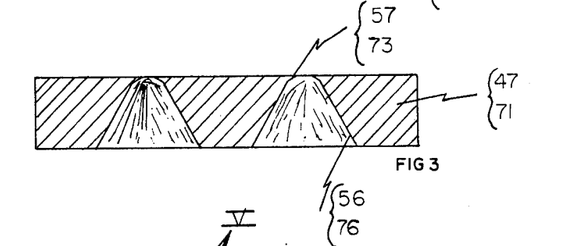
FIG. 3 is a section along line III—III of FIG. 2.

I prefer that the sprue chambers 56, 67 have the profile shown in FIG. 3 where they are tapered quickly in the vicinity of the face to small gates, 57, 73 (the taper angle being around 15°). This materially assists in clean severance of sprue and article and confines the gate mark 80 to as small an area as possible. In that respect I prefer, when using thermoplastic material to confine the gate diameter to about 1 mm.

Figure 4:
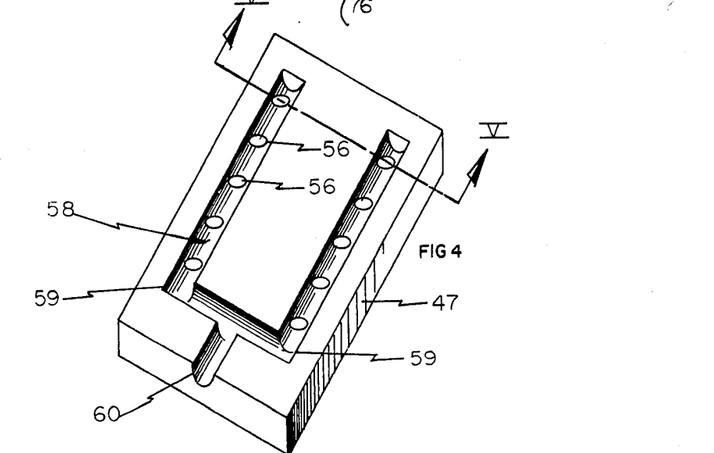
FIG. 4 is a perspective of an alternative embodiment of guide plate defining a runner channel and a plurality of sprue chambers.
Figure 5:
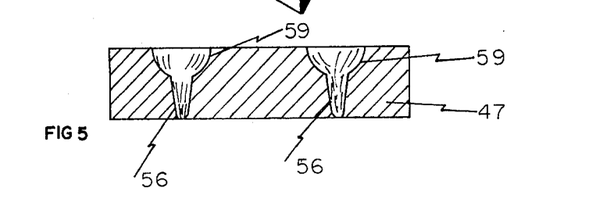
FIG. 5 is a section along lines V—V of FIG. 4.

Referring to FIGS. 4 and 5, an alternative embodiment of transfer plate defines not only a plurality of sprue chambers 56 but also a network of runners 58 in the form of two braches 59 communicating with a trunk 60. The application of this type of transfer plate is shown in section in FIG. 9.

Figure 6:
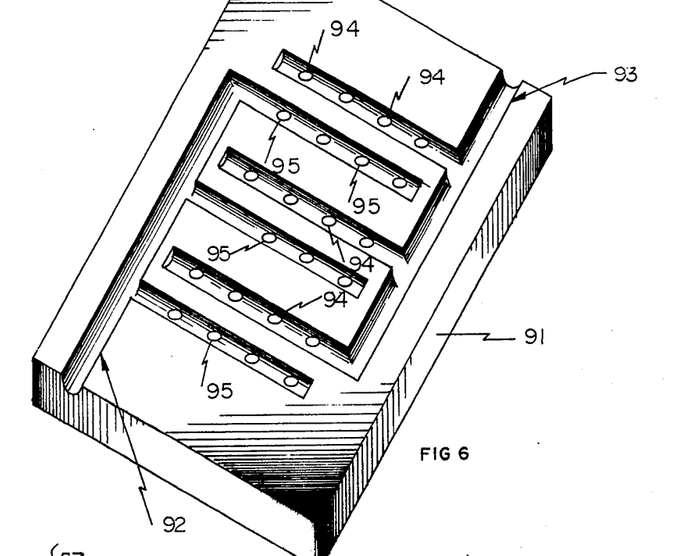
FIG. 6 is a perspective of yet another alternative embodiment of guide plate with two courses of runner channels each with a plurality of communicating sprue chambers.
Figure 7:
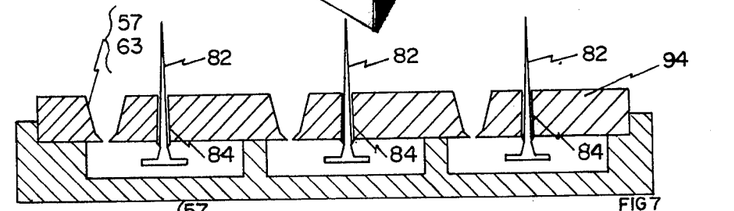
FIG. 7 is a cross section through part of a mould illustrating yet another alternative embodiment of guide plate employing a pin loading and retaining facility, engaged as a core to a mould having three cavities.

Referring to FIG. 6, a transfer plate 91 includes two independent runner networks, 92 and 93, respectively, independently communicating to a plurality of sprue chambers 94 and 95.

Figure 8:
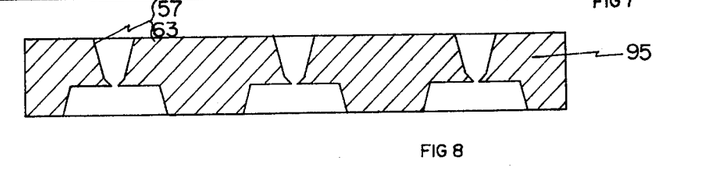
FIG. 8 is yet an alternative embodiment of a guide plate wherein it partially defines recesses for the mould cavity communicating with each sprue chamber.

Referring to FIGS. 8 and 9, alternative embodiments of transfer plates are shown as at 94 and 95, the former having apertures 84 to accommodate pins 82.

Figure 19:
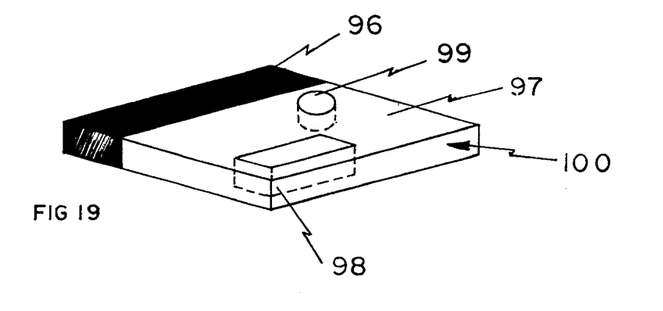
FIG. 19 is a perspective of a four material moulded article according to other embodiments of the invention.

Referring to FIGS. 19 through 29 and in particular FIG. 19 a four material article 100 may be composed of a first, second, third and fourth material, 96, 97, 98 and 99 respectively.

Figure 20:
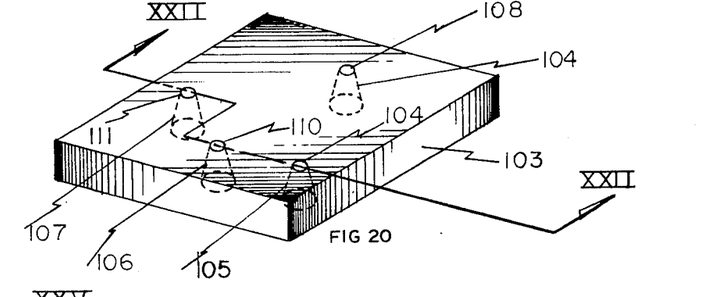
FIG. 20 is a perspective of yet another guide plate, having four sprue chambers for four different mould materials.
Figure 21:
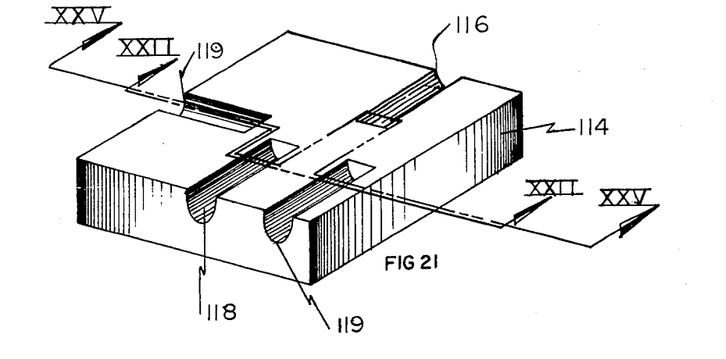
FIG. 21 is a perspective of the obverse side of the guide plate of FIG. 20 showing the runner channels.

Referring to FIGS. 20 and 21 an appropriate guide plate 103 for use in the four material article 100 may include four sprue chambers, 104, 105, 106 and 107 with gates 108, 109, 110 and 111 respectively.

Referring to FIG. 21 and an appropriate runner member 114 for fabricating the four material article 100 includes four independent runners, runner 116 adapted to mate sprue chamber 104 and gate 108; the runner 117 adapted to mate sprue chamber 107 and gate 111; the runner 118 to mate sprue chamber 106 and gate 110; and the runner 119 adapted to mate sprue chamber 105 and gate 109.

The first cavity member 121 includes a cavity 122 only large enough for the deposition of the first material 96.

Figure 22:
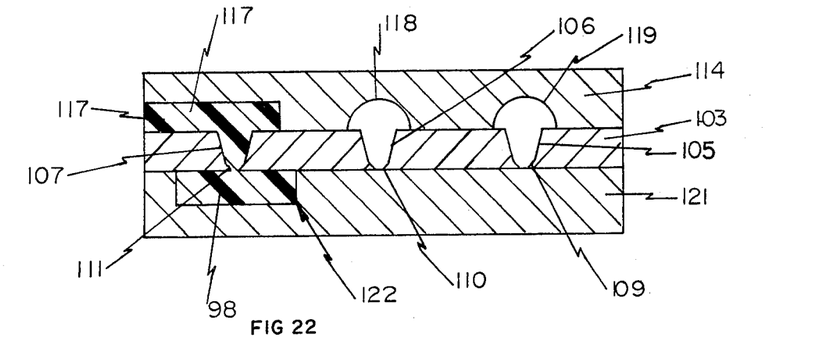
FIG. 22 is a section along line XXII — XXII wherein the guide plate of FIG. 21 is in its mould.

Referring particularly to FIG. 22 and a section along line XXII — XXII the three components of the first mould include a carrier member 104 surmounting a transfer plate 103 and a first cavity member 121. The first material is injected into the runner 117 and thence into cavity 122. As an integral unit the guide plate 103 and runner member 104 are removed from the cavity member 121.

Figure 23:
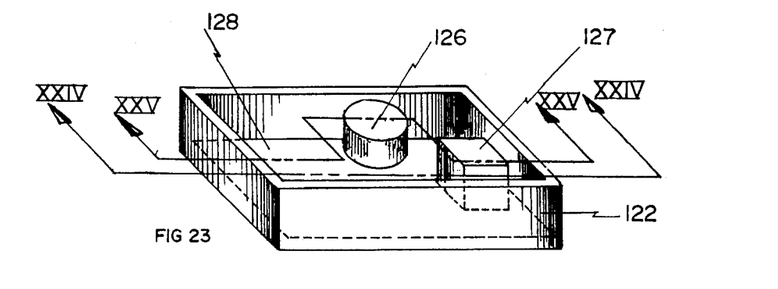
FIG. 23 is a perspective of a cavity employing die portions to define voids for a mould material.
Figure 24:
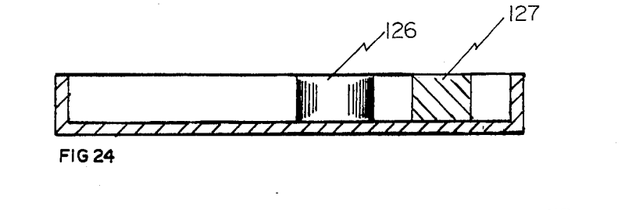
FIG. 24 is a section along lines XXIV — XXIV of FIG. 23.

Referring to FIGS. 23 and 24, a second cavity member 124 defines a cavity 128 for the second material 97 but includes die inserts, a cylinder 126 for defining the cavity for the fourth material 99, and a hexahedron 127, for defining the cavity of the third material 98.

Figure 25:
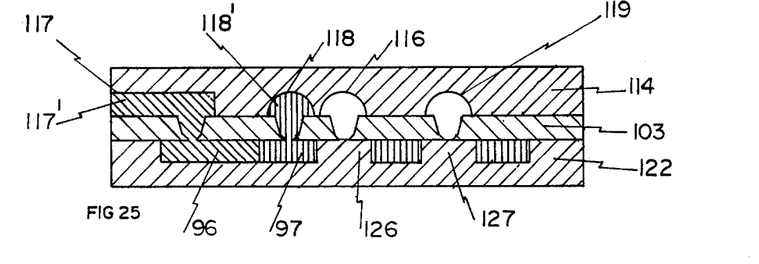
FIG. 25 is a cross section of a mould employing a guide plate permitting injection of four different materials, the only cavities being defined are for the first and second mould material.
Figure 26:
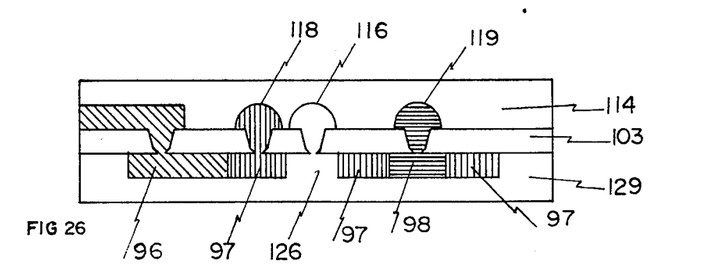
FIG. 26 is a cross section of the guide plate and its cover of FIG. 26 mounted over a cavity for injecting a third mould material.
Figure 27:
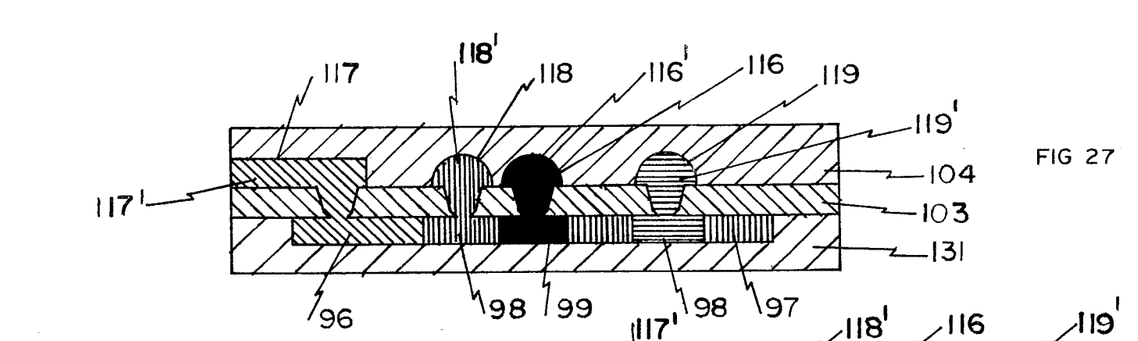
FIG. 27 is the section of the guide plate of FIGS. 25 and 26 through a mould which defines a cavity for the fourth mould material.

Referring to FIG. 25 the runner member 104 and guide plate 103 are mounted over the second cavity member 122. The second material 97 is injected through the runner 118 into the vacant regions of the cavity 128 whereby the vacant regions of the cavity are filled with the material 97. The transfer plate 103 and runner member 104 are disengaged as a unit from the second cavity member 122. Thence, they are placed over a third cavity member 129 having only the cylinder member 126 as a die. The third material is injected into the runner 129 and a section, corresponding to that along line XXV — XXV, generates the mould profile of FIG. 26. The guide plate 103, and runner member 104 are again removed as a unit, and placed on a fourth cavity member 131, having the die cylinder 126 removed. The fourth injection material is injected into the runner 116 and the cylinder cavity filled with this material. The cross section of the mould through a line through each of the sprue cavities is as illustrated in FIG. 27.

Figure 28:
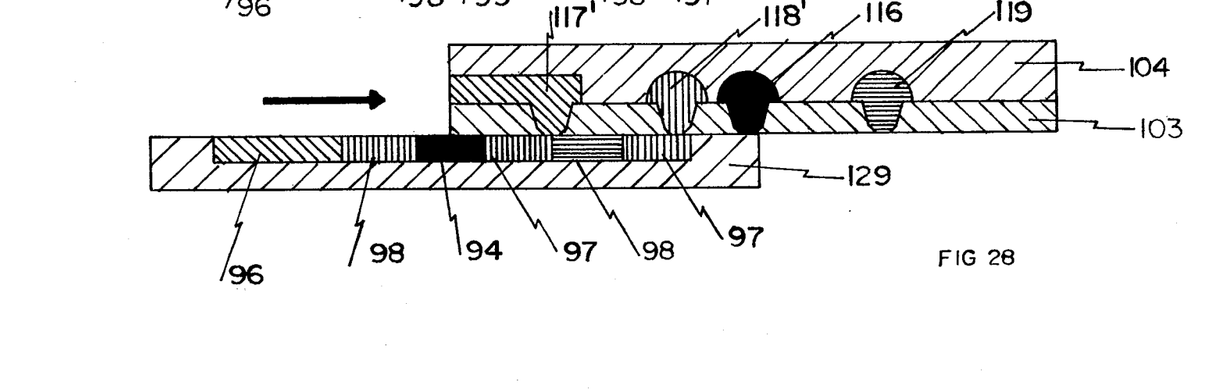
FIG. 28 is the section of the FIG. 27 but with the guide plate partially removed as by sliding, severing the sprues of the four mould material from the completed article at their gates.

The completed article 100 is by the simple expedient of shearing, the guide plate 103 and runner member 104 as a unit, removed, away from the gate-article interface, severing the several sprues 116', 117', 118', and 119' from the articles 100 at the respective gates.

Figure 29:
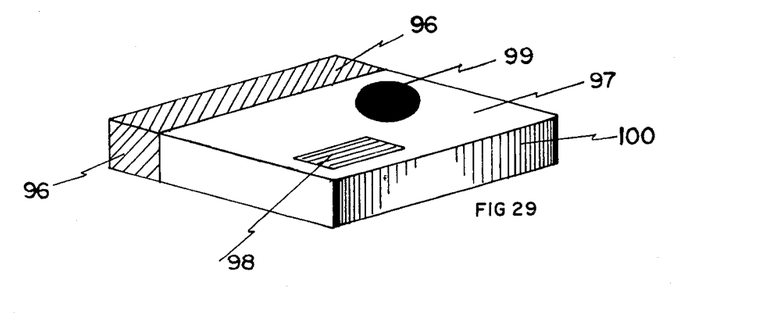
FIG. 29 is a perspective assembly drawing of the mould of FIG. 28 and resultant four material integrally moulded article separated (the cavities being omitted for clarity).
Figure 30:
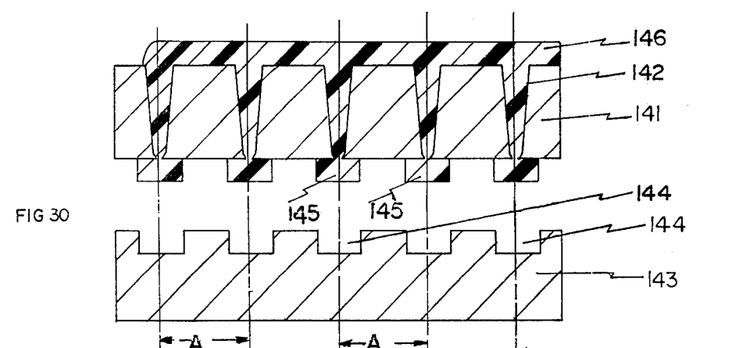
Figure 31:
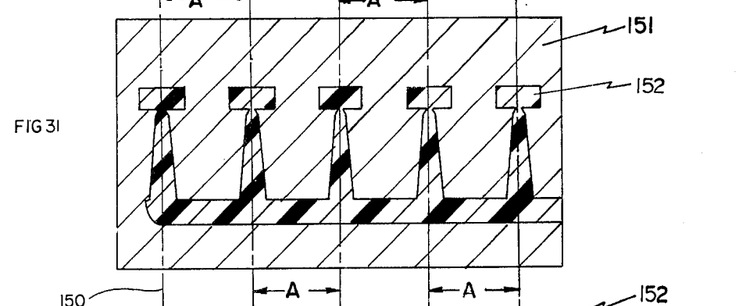
Figure 32:
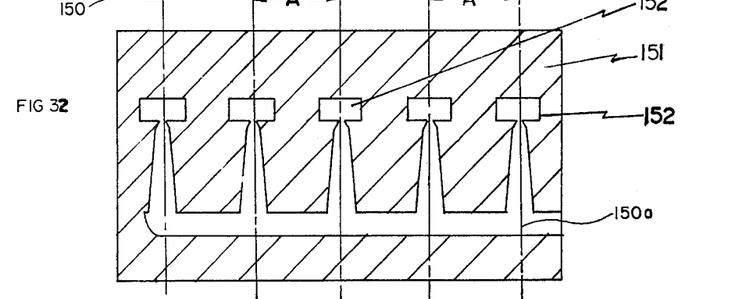
Figure 33:
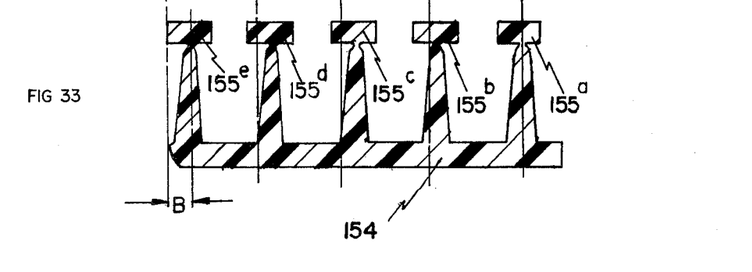

The assembly FIG. 29 depicts the guide plate 103 and the runner member 104 together with their respective sprues and the end product 100 (for clarity the cavity members are omitted).

It should be noted that in my cavity mould the transfer plate constrains linear shrinkage of the runner 146, because the sprues can not move so toward each other on cooling of the moulding material because of the fixed relation of the sprue chambers in the transfer plate. At the same time the article whether partially moulded or not becomes anchored to the transfer plate because of mould material shrinkage and the fact that the outside is on one side of the transfer plate the runner on the obverse side and the transfer sprue interconnects article and runner through the transfer plate. Thus articles are held or anchored on the transfer plate predictably and simple movement of the transport plate transports the articles into accurate registry within another cavity. These features thus have important application to ensure proper registration of partially moulded articles from mould station to subsequent mould station. It is these characteristics which allow me to fabricate precision replicas of national flags and other precision items according to the embodiments disclosed; irrespective of whether the material be a thermosetting plastics or thermoplastics or any other moldable or castable, organic or inorganic material.

The embodiments of the invention in which an exclusive property or privilege is claimed are defined as follows:

1. A method of moulding at least in part a three material, multi-material article in a plurality of stages which comprises:
   a. assembling a first mould including a transfer plate and a first mould cavity at a first moulding station, said transfer plate having a surface defining a part of said first mould and having at least three channels spaced from each other and extending therethrough, at least one of said channels being in communication with said first mould cavity;
   b. injecting a first mouldable material through said communicating channel in said transfer plate to create a first moulded stage in the first mould cavity, aid stage being held in fixed and oriented relationship to said transfer plate by integral connection with the moulded material in said channel;
   c. removing said first moulded stage and transfer plate from the first mould cavity and transferring it into registration with a second mould cavity having a different configuration at a second moulding station to assemble a second mould, said transfer plate defining a part of said second mould and wherein a second channel in said transfer plate communicates with the second mould cavity;
   d. injecting further mouldable material through said second channel in the transfer plate into the second mould cavity whereby a second state is formed and held in fixed and oriented relationship to said transfer plate;
   e. moulding at least one or more additional stages in succession by repeating steps (c) and (d) for each stage to form at least in part a three material, multi-material moulded article; and
   f. when the article is completed, severing the transfer plate from the completed multi-material moulded article.

2. The method of claim 1, wherein said transfer plate is severed in step (f) from said article by a relative sliding of said transfer plate with the last mould cavity.

3. The method of claim 1, including the further step of assembling a cover plate over said transfer plate at each moulding station to further define the appropriate channel therein.

4. A method of moulding multi-material articles in a plurality of stages which comprises:
   a. assembling a first mould including a first transfer plate and a plurality of first mould cavities at a first moulding station, said transfer plate having a surface defining a part of said first mould and having a plurality of channels therein that extend through the plate into communication with each of said first mould cavities;
   b. injecting a first mouldable material through each of said channels into each of said cavities to form first moulded stages held in fixed and oriented relationship to said first transfer plate by integral connection with the moulded material in the channels;
   c. removing said first transfer plate and said first moulded stages from the first mould cavities and transferring it into registration with a plurality of second mould cavities at a second moulding station;
   d. severing said first moulded stages from said first transfer plate following registration;
   e. assembling a second mould including a second transfer plate with said second mould cavities, said second transfer plate having a surface defining a part of said second mould and having a plurality of channels therein that extend through the plate and communicate with each of said second mound cavities;
   f. injecting a second mouldable material through each of said second channels into each of said second cavities to form second moulded stages held in fixed and oriented relationship to said second transfer plate to thereby form, at least in part, multi-material moulded articles; and
   g. severing said second moulded stages from said second transfer plate.

5. The method of claim 4, including moulding at least one or more additional stages in succession by repeating steps (c) through (f) for each additional stage until the articles are completed; and then severing in step (g) the completed multi-material moulded articles from the last transfer plate following completion of the last moulding stage.

6. The method of claim 4, wherein said transfer plates are severed from said moulded stages by relative sliding of said transfer plate with its associated mould.

7. The method of claim 4, including the further step of assembling a cover plate over each transfer plate to further define the channels therein.

* * * * *

UNITED STATES PATENT AND TRADEMARK OFFICE
CERTIFICATE OF CORRECTION

PATENT NO. : 4,073,854

DATED : February 14, 1978

INVENTOR(S) : Arthur Burry

It is certified that error appears in the above–identified patent and that said Letters Patent are hereby corrected as shown below:

Column 7, line 17, "aid" should read --said--;

line 30, "state" should read --stage--; and

Column 8, line 25, "mound" should read --mould--.

Signed and Sealed this

Thirteenth Day of February 1979

[SEAL]

Attest:

RUTH C. MASON
*Attesting Officer*

DONALD W. BANNER
*Commissioner of Patents and Trademarks*